(12) United States Patent
Song et al.

(10) Patent No.: US 8,423,089 B2
(45) Date of Patent: Apr. 16, 2013

(54) MOBILE TERMINAL AND METHOD FOR CONTROLLING OPERATION OF THE SAME

(75) Inventors: Yoo Mee Song, Seoul (KR); Hu Ran Choi, Seoul (KR); Seung Hyun Yang, Seoul (KR); Se Il Hwang, Seoul (KR); Myo Ha Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 276 days.

(21) Appl. No.: 12/796,182

(22) Filed: Jun. 8, 2010

(65) Prior Publication Data

US 2010/0317410 A1   Dec. 16, 2010

(30) Foreign Application Priority Data

Jun. 11, 2009   (KR) .................. 10-2009-0052038

(51) Int. Cl.
*H04B 1/38* (2006.01)
(52) U.S. Cl.
USPC ......... 455/566; 455/550.1; 455/418; 345/173
(58) Field of Classification Search ............... 455/550.1, 455/566, 418, 425, 575.1, 575.3, 575.4; 345/173
See application file for complete search history.

(56) References Cited

U.S. PATENT DOCUMENTS

| | | | |
|---|---|---|---|
| 2005/0079896 A1* | 4/2005 | Kokko et al. ............... | 455/566 |
| 2009/0227279 A1* | 9/2009 | Yuki et al. ............... | 455/550.1 |
| 2009/0303199 A1* | 12/2009 | Cho et al. ............... | 345/173 |
| 2010/0073303 A1* | 3/2010 | Wu et al. ............... | 345/173 |
| 2010/0146459 A1* | 6/2010 | Repka ............... | 715/863 |

* cited by examiner

*Primary Examiner* — Kathy Wang-Hurst
(74) *Attorney, Agent, or Firm* — KED & Associates, LLP

(57) ABSTRACT

A mobile terminal and a method for controlling operation of the same are provided. A command input key including a command or an icon, which allows the user to input a command to execute an application to the mobile terminal, is displayed on the mobile terminal. The user may input a command to execute at least two applications to the mobile terminal through one command input key. The display state of the command input key is changed according to the pressure or duration of operation of the command input key. Through the changed display state of the command input key, the user can know which type of application is executed in response to operation of the command input key.

20 Claims, 10 Drawing Sheets

(a)   (b)

(a) 1sec    (b) 2sec

MOBILE TERMINAL AND METHOD FOR CONTROLLING OPERATION OF THE SAME

CROSS-REFERENCE TO RELATED APPLICATION(S)

This application claims the benefit of Korean Application No. 10-2009-0052038, filed Jun. 11, 2009 in the Korean Intellectual Property Office, the disclosure of which is incorporated herein by reference.

BACKGROUND

1. Field

The present patent or application relates to a mobile terminal and a method for controlling the operation of the same, and more particularly to a mobile terminal and a method for controlling the operation of the same, wherein at least two commands can be input through one command input key.

2. Background

A mobile terminal is a portable device having a function to perform voice and video communication, a function to receive and output information, or a function to store data. As the functionality of the mobile terminal has been diversified, a mobile terminal having various complicated functions such as a function to capture still or moving images (i.e., photographs or videos), a function to reproduce music or video files, a game function, a function to receive broadcasts, and a wireless Internet function has been implemented as an all-in-one multimedia player.

Various novel attempts have been made in terms of hardware or software to achieve more complicated functions of the mobile terminal implemented as a multimedia player. One example is provision of a user interface environment allowing the user to easily and conveniently find and select a desired function. As the mobile terminal is now considered a personal belonging expressing the user's personality, there has been demand for various interface designs such as a double-sided Liquid Crystal Display (LCD), which can be viewed from both sides, or a touch screen.

However, allocation of space for a user interface such as a keypad or a display is restricted since the mobile terminal should be designed taking into consideration mobility or portability. To efficiently use various functions provided by the mobile terminal, there is a need to control the operation of the mobile terminal using a new input/output scheme instead of a conventional scheme in which menu items in a complicated structure are sequentially selected.

The above references are incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein.

The above and other objects, features and other advantages of the present patent or application will be more clearly understood from the following detailed description taken in conjunction with the accompanying drawings, in which.

DETAILED DESCRIPTION

A mobile terminal as described in this specification may encompass a mobile phone, a smart phone, a laptop, a digital broadcast terminal, a Personal Digital Assistant (PDA), a Portable Multimedia Player (PMP), a navigation device, or the like.

Figure 1:
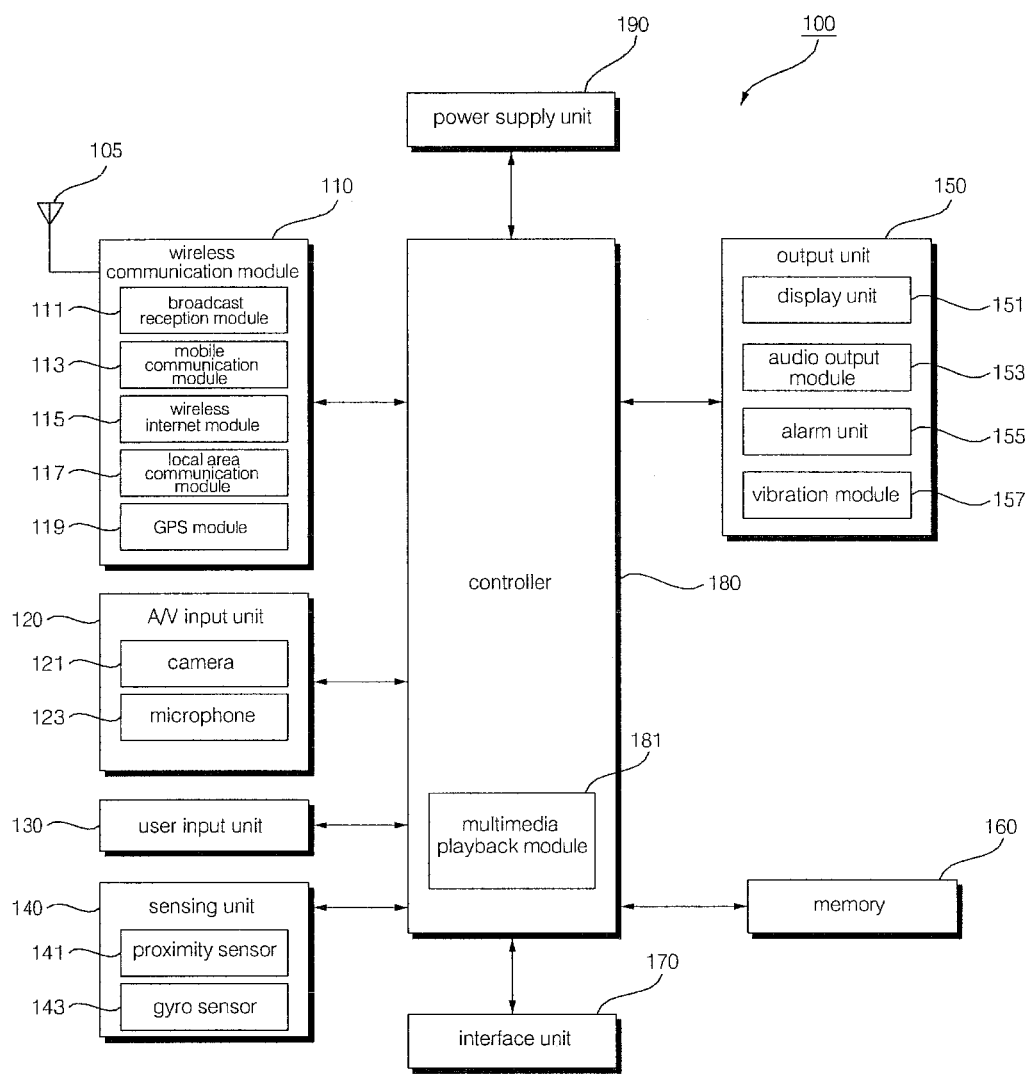
FIG. 1 is a block diagram of a mobile terminal according to an embodiment of the present patent or application.

FIG. 1 is a block diagram of a mobile terminal according to an embodiment of the present patent or application. The mobile terminal according to the embodiment of the present patent or application is described below with reference to FIG. 1, from the viewpoint of functional components thereof.

As shown in FIG. 1, the mobile terminal 100 may include a wireless communication unit 110, an Audio/Video (AV) input unit 120, a user input unit 130, a sensing unit 140, an output unit 150, a memory 160, an interface unit 170, a controller 180, and a power supply unit 190. In actual applications, two or more of these components may be combined into one component or one component may be divided into two or more components as needed. For example, the A/V input unit 120 or the sensing unit 140 may be incorporated into the user input unit 130.

The wireless communication unit 110 may include a broadcast receiving module 111, a mobile communication module 113, a wireless Internet module 115, a local area communication module 117, and a Global Positioning System (GPS) module 119.

The broadcast receiving module 111 receives at least one of a broadcast signal and broadcast-related information from an external broadcast management server through a broadcast channel. The broadcast channel may include a satellite channel, a terrestrial channel, or the like. The broadcast management server may be a server that generates and transmits at least one of a broadcast signal and broadcast-related information or a server that receives and transmits at least one of a broadcast signal and broadcast-related information, which have been previously generated, to a terminal.

The broadcast-related information may be information relating to a broadcast channel, a broadcast program, or a broadcast service provider. The broadcast signal may not only include a TV broadcast signal, a radio broadcast signal, or a data broadcast signal but may also include a broadcast signal generated by incorporating a data broadcast signal into a TV or radio broadcast signal. The broadcast-related information may also be provided through a mobile communication network. In this case, the broadcast-related information may be received by the mobile communication module 113. The broadcast-related information may be provided in various forms. For example, the broadcast-related information may be provided in the form of a Digital Multimedia Broadcasting (DMB) Electronic Program Guide (EPG) or a Digital Video Broadcast-Handheld (DVB-H) Electronic Service Guide (ESG).

The broadcast receiving module 111 receives a broadcast signal using a variety of broadcast systems. Specifically, the broadcast receiving module 111 may receive a digital broadcast signal using a digital broadcast system such as a Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), or Integrated Services Digital Broadcast-Terrestrial (ISDB-T) system. The broadcast receiving module 111 may be configured to be suitable not only for such a digital broadcast system but also for any other broadcast system that provides a broadcast signal. A broadcast signal and/or broadcast-related information received through the broadcast receiving module 111 may be stored in the memory 160.

The mobile communication module 113 transmits and receives a wireless signal to and from at least one of a base station, an external terminal, and a server over a mobile communication network. The wireless signal may include a voice call signal, a video call signal, or various types of data associated with transmission and reception of a text/multimedia message.

The wireless Internet module 115 is an internal or external module for wireless Internet access which may be provided to the mobile terminal 100. The local area communication module 117 is a module for local area communication. Here, Bluetooth, Radio Frequency Identification (RFID), Infrared Data Association (IrDA,), Ultra Wideband (UWB), or ZigBee may be used as a local area communication technology. The GPS module 119 receives location information from multiple GPS satellites.

The A/V input unit 120 is provided to input an audio or video signal and may include a camera 121 and a microphone 123. The camera 121 processes an image frame such as a still image (or photograph) or a moving image (or video) obtained through an image sensor in a video communication mode or an image capture mode. The processed picture frame may be displayed on the display unit 151.

The picture frame processed at the camera 121 may be stored in the memory 160 or may be transmitted to the outside through the wireless communication unit 110. Two more cameras 121 may be provided depending on the configuration of the mobile terminal.

The microphone 123 receives an external audio signal in a voice or video communication mode, a record mode, or a voice recognition mode and processes the same into audio data. In the voice or video communication mode, the processed audio data may be converted into a form transmittable to a mobile communication base station through the mobile communication module 113. A variety of noise removal algorithms may be used to remove noise generated in the course of receiving an external audio signal through the microphone 123.

The user input unit 130 generates key input data corresponding to a key input operation that a user has performed to control the operation of the terminal. The user input unit 130 may include a key pad, a dome switch, a resistive/capacitive touchpad, a jog wheel, a jog switch, a finger mouse, or the like. In the case where the touchpad forms a multilayer structure with the display unit 151 that is described later, the touchpad may be referred to as a "touch screen."

The sensing unit 140 detects a current state of the mobile terminal 100 such as whether the mobile terminal 100 is opened or closed, the position of the mobile terminal 100, or whether or not the user is in contact with the mobile terminal 100 and generates a sensing signal for controlling the operation of the mobile terminal 100. The sensing unit 140 may sense whether the mobile terminal 100 is opened or closed when the mobile terminal 100 is a slide phone. The sensing unit 140 may also be responsible for sensing functions associated with whether or not the power supply unit 190 is supplying power or whether or not the interface unit 170 is coupled to an external device.

The sensing unit 140 may include a proximity sensor 141. The proximity sensor 141 can detect presence or absence of an object that is approaching or near to the sensing unit 140 without mechanical contact. The proximity sensor 141 can detect a close object using change of AC magnetic fields or change of magnetostatic fields or using the rate of change of capacitance. Two or more proximity sensors 141 may be provided depending on the configuration of the mobile terminal.

The sensing unit 140 may include a gyro sensor 142. The gyro sensor 142 includes an inertial sensor, an acceleration sensor, or any sensor which detects movement of an object using a gyroscope. The gyroscope is classified into a mechanical gyroscope, a ring laser gyroscope, and a fiber optic gyroscope. The gyro sensor 142 detects movement of the mobile terminal and provides a signal for controlling the mobile terminal.

The output unit 150 is provided to output an audio or video signal or an alarm signal and may include a display unit 151, an audio output module 153, an alarm unit 155, and a vibrating module 157.

The display unit 151 displays information processed in the mobile terminal 100. For example, when the mobile terminal 100 is in a voice or video communication mode, the display unit 151 displays a communication-related User Interface (UI) or Graphical User Interface (GUI). When the mobile terminal 100 is in a video communication mode or an image capture mode, the display unit 151 may individually or simultaneously display captured or received images and may display a corresponding UI or GUI.

In the case where the display unit 151 forms a multilayer structure with the touchpad to construct a touch screen as described above, the display unit 151 may not only be used as an output device but may also be used as an input device. In the case where the display unit 151 constructs a touch screen, the display unit 151 may include a touch screen panel, a touch screen panel controller, or the like. The touch screen panel is a transparent panel externally attached to the mobile terminal 100 and may be connected to an internal bus of the mobile terminal 100. The touch screen panel monitors touches and sends, upon detecting a touch input, corresponding signals to the touch screen panel controller. The touch screen panel controller processes the signals and transmits the resulting data to the controller 180 and the controller 180 then determines whether or not a touch input has occurred and which region of the touch screen has been touched.

The display unit 151 may include at least one of a liquid crystal display, a thin film transistor-liquid crystal display, an organic light-emitting diode, a flexible display, a transparent display, and a 3D display. Two or more display units 151 may be provided depending on the implementation of the mobile terminal 100. For example, both an external display unit (not shown) and an internal display unit (not shown) may be provided to the mobile terminal 100.

The audio output module 153 outputs audio data received from the wireless communication unit 110 or stored in the memory 160 when the mobile terminal 100 is in an incoming call receiving mode (i.e., a ringing mode), a voice or video communication mode, a record mode, a voice recognition mode, or a broadcast receiving mode. The audio output module 153 outputs audio signals associated with functions performed by the mobile terminal 100, for example, an audio signal associated with an incoming call sound (i.e., ringtone) or a message receipt sound. The audio output module 153 may include a speaker, a buzzer, or the like.

The alarm unit 155 outputs a signal notifying the user that an event has occurred in the mobile terminal 100. Examples of the event occurring in the mobile terminal 100 include incoming call reception, message reception, and key signal input. The alarm unit 155 outputs a signal notifying the user of the occurrence of an event in a different form from the audio or video signal. For example, the alarm unit 155 may output the notification signal through vibration. When an incoming call signal is received or when a message is received, the alarm unit 155 may output a signal indicating the reception of the incoming call signal or the message. When a key signal is input, the alarm unit 155 may output a signal as a feedback to the key signal input. The user can perceive the event occurrence through the signal output from the alarm unit 155. Of course, the signal indicating the event occurrence may also be output through the display unit 151 or the audio output module 153.

The vibrating module 157 may generate vibration having varying degrees of intensity and patterns according to a vibration signal transmitted by the controller 180. The strength, pattern, frequency, moving direction, moving speed, and the like of the vibration generated by the vibrating module 157 may be set by the vibration signal. Two or more vibration modules 157 may be provided depending on the mode of implementation of the mobile terminal 100.

The memory 160 may store a program for processing and control by the controller 180 and may function to temporarily store input or output data items (for example, a phonebook, messages, still images, and moving images).

The memory 160 may include a storage medium of at least one of a variety of types including a flash memory type, a hard disk type, a multimedia card micro type, a card memory type (for example, SD or XD memory), RAM, and ROM. The mobile terminal 100 may utilize cloud storage that performs a storage function of the memory 160 over the Internet.

The interface unit 170 functions to interface with all external devices connected to the mobile terminal 100. Examples of the external devices connected to the mobile terminal 100 include a wired/wireless headset, an external battery charger, a wired/wireless data port, a memory card, a card socket such as an SIM/UIM card socket, an audio Input/Output (I/O) terminal, a video I/O terminal, and an earphone. The interface unit 170 may receive power or data from such an external device and provide the same to each internal component of the mobile terminal 100 and may transmit internal data of the mobile terminal 100 to the external device.

The controller 180 generally controls the operation of each component to control the overall operation of the mobile terminal 100. For example, the controller 180 performs control and processing associated with voice communication, data communication, video communication, and the like. The controller 180 may include a multimedia playback module 181 for multimedia reproduction. The multimedia playback module 181 may be implemented by hardware in the controller 180 or may be implemented by software separately from the controller 180.

Under control of the controller 180, the power supply unit 190 receives external power or internal power and supplies power required for operation to each component.

The mobile terminal according to the present patent or application has been described above from the viewpoint of functional components thereof. In the following, the mobile terminal according to the present patent or application is described in detail with reference to FIGS. 2 and 3, from the viewpoint of components viewed on the external surface thereof. For ease of explanation, the following description will be given with reference to a bar type mobile terminal having a front touch screen as an example among various types of mobile terminals such as folder, bar, swing, and slider types. However, the present patent or application is not limited to the bar type mobile terminal and can be applied to any type of mobile terminal including the types described above.

Figure 2:
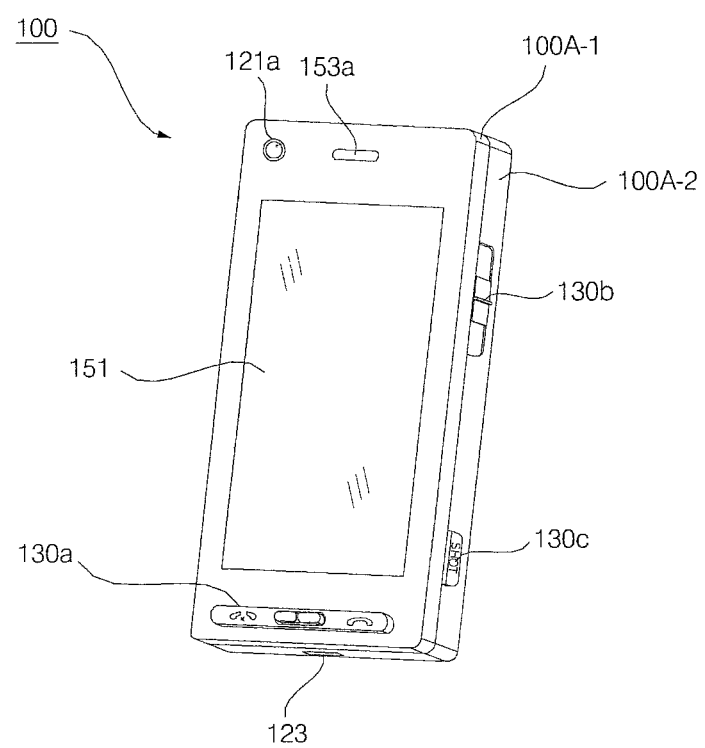
FIG. 2 is a front perspective view of a mobile terminal according to an embodiment of the present patent or application.

FIG. 2 is a front perspective view of a mobile terminal according to an embodiment of the present patent or application. As shown in FIG. 2, a case defining the external appearance of the mobile terminal 100 includes a front case 100A-1 and a rear case 100A-2. A variety of electronic parts are provided in a space defined within the front and rear cases 100A-1 and 100A-2. At least one intermediate case may be additionally provided between the front case 100A-1 and the rear case 100A-2. These cases may be formed through synthetic resin injection molding may be formed of a metal material such as stainless steel (STS) or titanium (Ti).

A display unit 151, a first audio output module 153*a*, a first camera 121*a*, and a first user input unit 130*a* may be arranged in a main body of the mobile terminal 100, specifically, in the front case 100A-1. A second user input unit 130*b*, a third user input unit 130*c*, and a microphone 123 may be arranged on a side surface of the rear case 100A-2.

The display unit 151 includes a Liquid Crystal Display (LCD), Organic Light Emitting Diodes (OLED), or the like to visually express information. A touchpad may be formed in a layered structure overlapping the display unit 151 such that the display unit 151 operates as a touch screen allowing the user to input information through touching.

The first audio output module 153*a* may be implemented in a receiver or speaker form. The first camera 121*a* may be implemented to be suitable for capturing a still or moving image of the user or the like. The microphone 123 may be implemented in a form suitable for receiving sound such as user voice.

The first to third user input units 130*a*, 130*b*, and 130*c* may be collectively referred to as a user input unit 130. The user input unit 130 may be of any type, provided that the user input unit 130 is operated in a tactile manner such that it is operated through tactile interaction with the user.

For example, the user input unit 130 may be implemented as a dome switch or a touchpad that can receive a command or information through a push or touch operation by the user. The user input unit 130 may also be implemented as a jog wheel or a joystick. In terms of functionality, the first user input unit 130*a* allows the user to input a command such as start, end, or send and the second user input unit 130*b* allows the user to select an operating mode of the mobile terminal 100. The third user input unit 130*c* may function as a hot key for activating a special function of the mobile terminal 100.

When a finger of the user comes close to the display unit 151, the proximity sensor 141 mounted on a first body detects the finger and outputs a close signal. Here, the proximity sensor 141 may be configured to output a different close signal according to the distance of the finger of the user from the proximity sensor 141. Generally, a proximity sensor outputs a close signal when an object has come within a so-called "detection distance." Multiple proximity sensors having different detection distances may be used to determine object proximity by comparing close signals output from the multiple proximity sensors.

Multiple proximity sensors having different detection regions may also be provided on the mobile terminal 100 to determine both a region on the display unit 151 which an object has approached and whether or not an object has moved after approaching the display unit 151 by identifying which proximity sensor(s) has output a close signal among the multiple proximity sensors. The controller 180 may also perform a control operation to select a key corresponding to a location at which the user's finger or the like has approached the display unit 151 and to output a vibrating signal corresponding to the key.

When the user inclines or shakes the mobile terminal, the gyro sensor 142 detects movement of the mobile terminal. The gyro sensor 142 generates a signal corresponding to movement of the mobile terminal and outputs the signal to the controller 180. The controller 180 detects movement-related information such as moving direction, angle, speed, and current position of the mobile terminal from the signal generated by the gyro sensor 142.

The controller 180 tracks movement of the mobile terminal through the information detected from the signal generated by the gyro sensor 142. Information that can be detected from the signal generated by the gyro sensor 142 may vary depending on the constituent parts of the gyro sensor 142. The gyro sensor 142 included in the mobile terminal is designed according to movement information of the mobile terminal that needs to be detected. The mobile terminal may include at least one gyro sensor 142. The controller 180 may control the gyro sensor 142 to operate only when a specific application is running according to information that needs to be detected.

Figure 3:
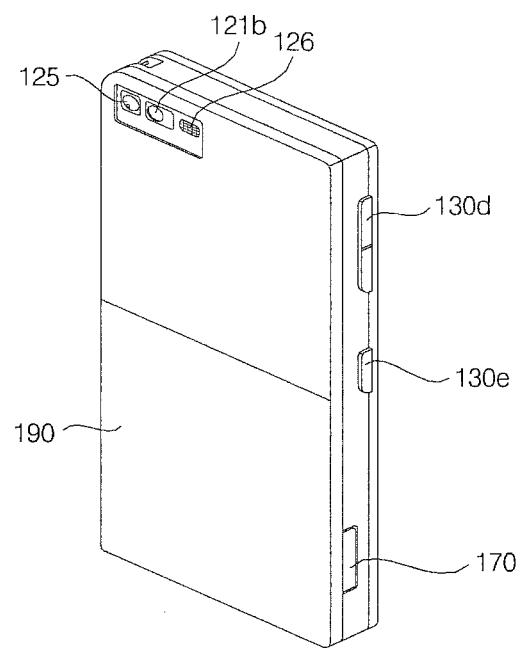
FIG. 3 is a rear perspective view of a mobile terminal according to an embodiment of the present patent or application.

FIG. 3 is a rear perspective view of the mobile terminal shown in FIG. 2. As shown in FIG. 3, a fourth user input unit 130*d*, a fifth user input unit 130*e*, and an interface unit 170 may be provided on a side surface of the rear case 100A-2 and a second camera 121*b* may be additionally provided on a rear surface of the rear case 100A-2.

The second camera 121*b* may have a capture direction substantially opposite to that of the first camera 121*a* and have a different pixel resolution from that of the first camera 121*a*. For example, the first camera 121*a* preferably has a low pixel resolution such that it is suitable to capture and transmit an image of the face of the user, for example, in the case of video communication and the second camera 121*b* preferably has a high pixel resolution since, when the user captures a general object using the second camera 121*b*, the user generally does not immediately transmit the captured image.

A mirror 125 and a flash lamp 126 may be additionally provided on the mobile terminal 100 near the second camera 121*b*. The mirror 125 allows the user to view their face or the like when capturing themselves using the second camera 121*b* (i.e., in the case of self-shooting). The flash lamp 126 shines light toward a subject when the subject is captured using the second camera 121*b*.

A second audio output module (not shown) may be additionally provided on the rear case 100A-2. The second audio output module may implement a stereo function in conjunction with the first audio output module 153*a* and may be used to perform voice or video communication in a speakerphone mode.

In addition to an antenna for communication, an antenna for receiving broadcast signals (not shown) may be provided on the rear case 100A-2 at a portion thereof. Each antenna may be mounted to be retractable from the rear case 100A-2.

The interface unit 170 is a channel through which the mobile terminal 100 can exchange data or the like with an external device. For example, the interface unit 170 may be at least one of a connection terminal for wired or wireless connection to an earphone, a port for local area communication, and power supply terminals for supplying power to the mobile terminal 100. The interface unit 170 may be a card socket for receiving an external card such as a Subscriber Identification Module (SIM), a User Identity Module (UIM), or a memory card for information storage.

A power supply unit 190 for supplying power to the mobile terminal 100 is provided on the rear case 100A-2. The power supply unit 190 is, for example, a rechargeable battery which is detachably mounted to the rear case 100A-2 for the purpose of recharging or the like.

Although the above description has been given with reference to an example where the second camera 121*b* is provided on the rear case 100A-2, the present patent or application is not limited to this example. When the second camera 121*b* is not provided, the first camera 121*a* may be formed to be rotatable so as to enable capturing in the same capture direction as that of the second camera 121*b*.

Figure 4:
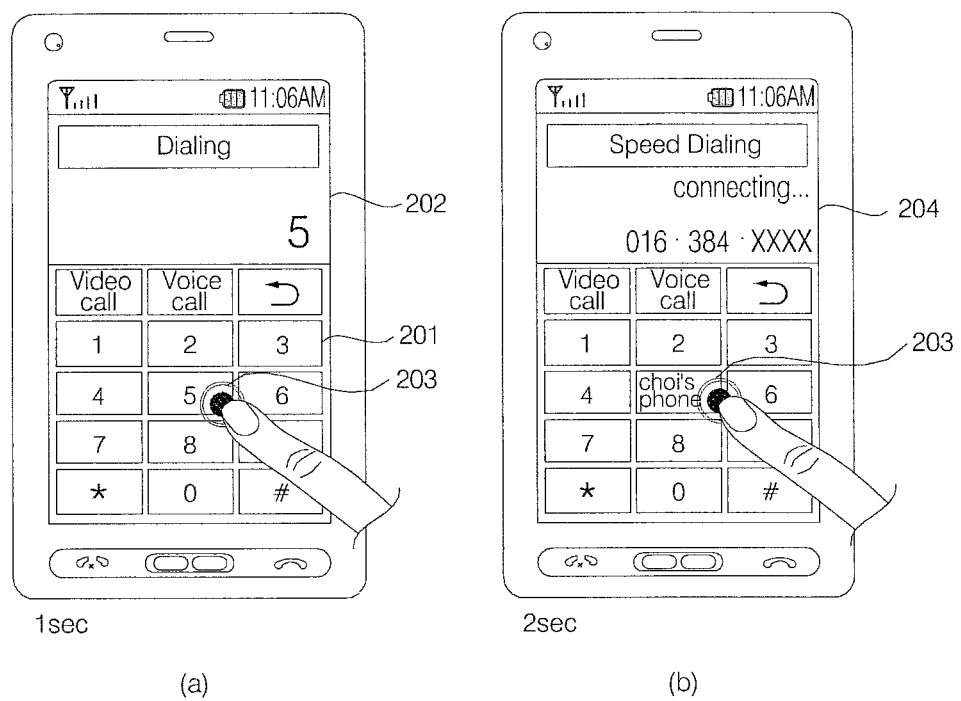
FIGS. 4(*a*) and 4(*b*) illustrate screens displayed on a display unit of a mobile terminal according to an embodiment of the present patent or application.

FIGS. 4(*a*) and 4(*b*) illustrate screens displayed on a display unit of a mobile terminal according to a first embodiment of the present patent or application.

As shown in FIG. 4(*a*), the controller 180 displays a keypad window 201 including command input keys, which allow the user to input a phone number, on the display unit of the mobile terminal. A number corresponding to a command input key touched through the keypad window 201 is displayed on an input number display window 202. In this embodiment, the display unit includes a touch screen. The mobile terminal may include physical keys corresponding to command input keys displayed on the display unit. In this case, operation of the command input keys corresponds to operation of the physical keys.

As shown in FIG. 4(*a*), the user touches a command input key 203 on the keypad window 201 for 1 second. The controller 180 displays a number corresponding to the command input key 203 on the input number display window 202 upon detecting the touch of the command input key 203.

As shown in FIG. 4(*b*), the user may continue to touch the command input key 203 of the keypad window 201. In this embodiment, the controller 180 has been set to display a number corresponding to a command input key 203 on the input number display window 202 when the command input key 203 has been touched for less than a predetermined time. The controller 180 is also set to execute a speed dial application when the command input key 203 has been touched for the predetermined time or longer. The speed dial application is an application for calling a phone number stored in association with the command input key.

As shown in FIG. 4(*b*), when the user has touched the command input key 203 for 2 seconds, the controller 180 determines that the command input key 203 has been touched for 2 seconds or longer. The controller 180 changes a display state of the command input key 203 as shown in FIG. 4(*b*). In this embodiment, the controller 180 has been set to call Choi's phone when the command input key 203 has been touched for the predetermined time or longer. Thus, the command input key 203 is changed to a command input key to execute an application for calling Choi's phone. From the command input key 203 whose display state has been changed, the user can know that the application for calling Choi's phone will be executed.

The controller 180 may display Choi's phone number on a speed dial display window 204 while ringing Choi's phone.

Figure 5:
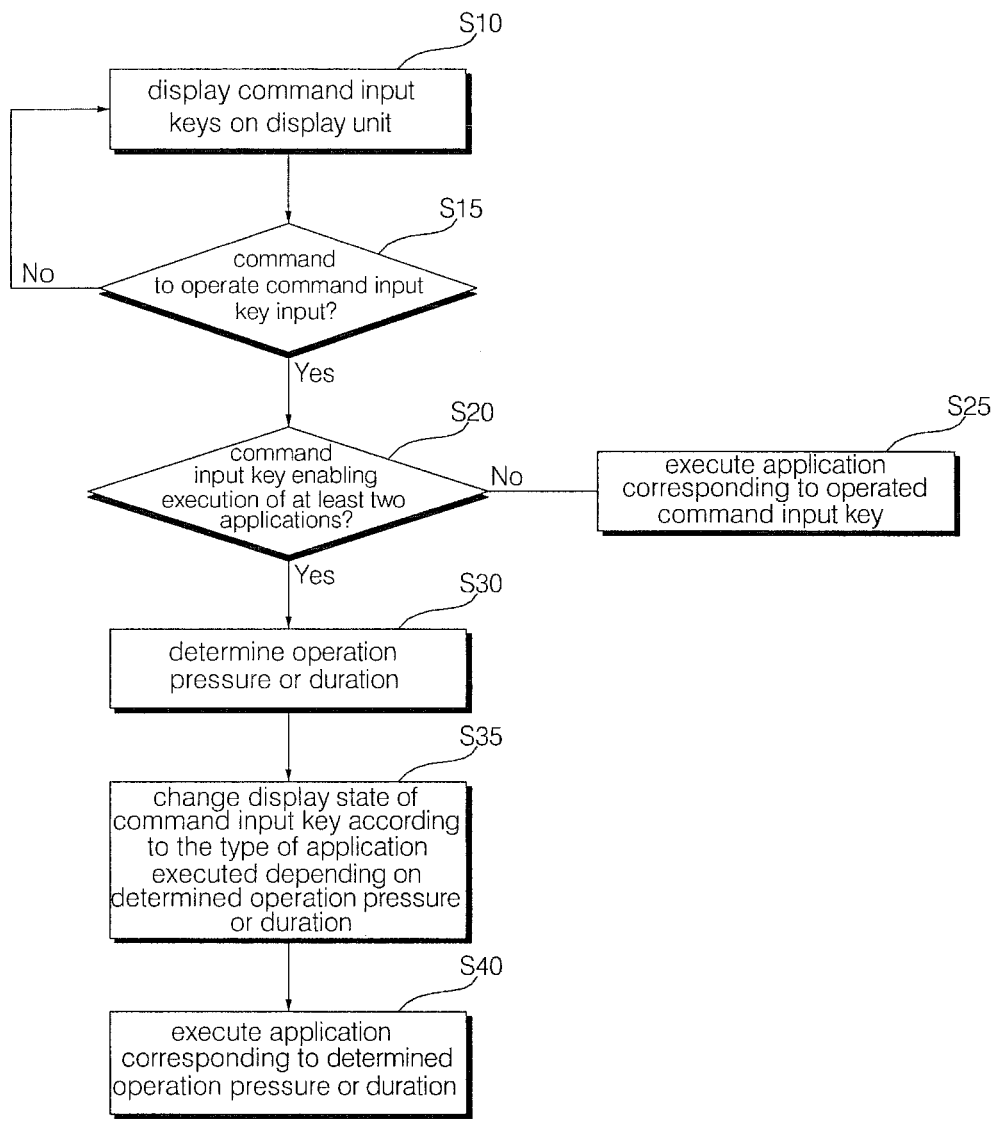
FIGS. 5 to 6 are flow charts illustrating a method for controlling the operation of a mobile terminal according to embodiments of the present patent or application.
Figure 6:
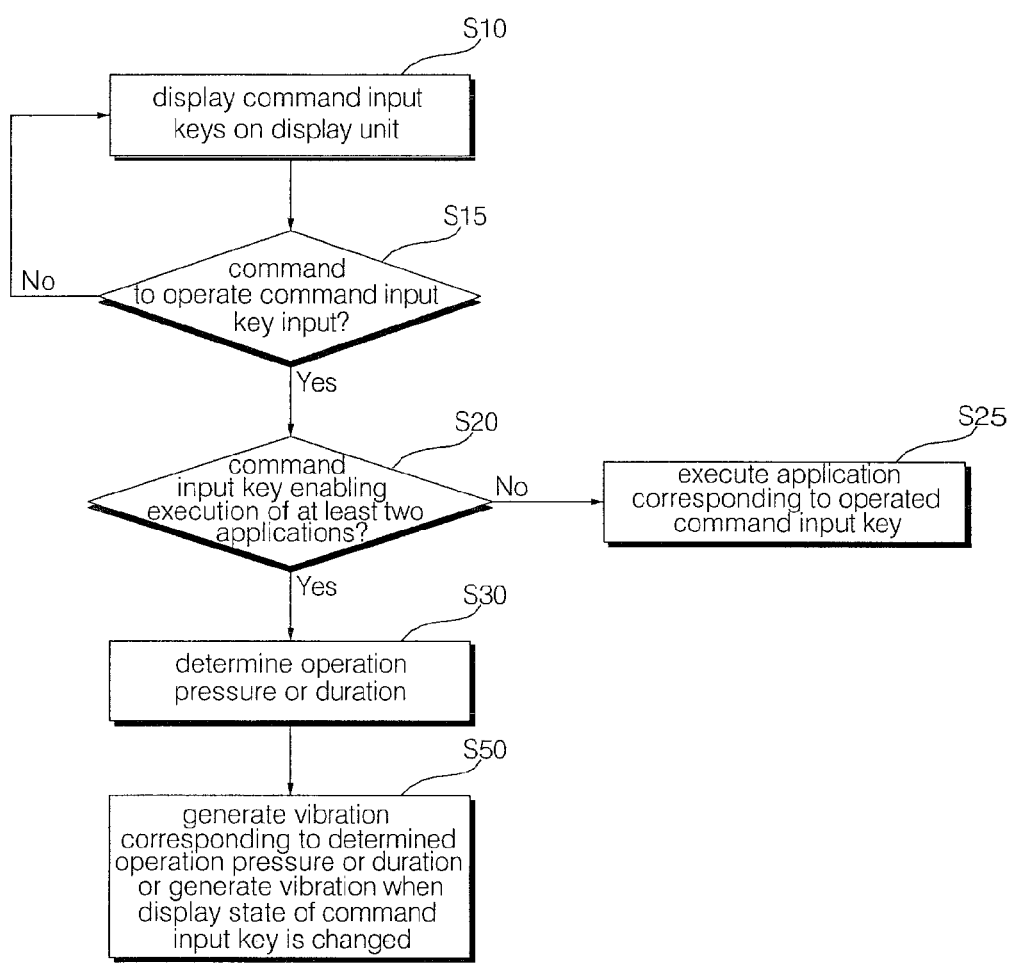

FIGS. 5 to 6 are flow charts illustrating a method for controlling the operation of a mobile terminal according to second and third embodiments of the present patent or application.

In FIG. 5, the controller 180 displays command input keys on the display unit (S10). The command input keys are objects displayed on the display unit to allow the user to input commands to the mobile terminal. The command input keys may include an icon, an on-screen display (OSD), a widget, a menu item, and the like.

The controller 180 determines whether or not a command to operate a command input key displayed on the display unit has been input (S15). The user may touch a command input key displayed on the display unit, which is constructed of a touch screen, or may operate a physical key corresponding to the command input key displayed on the display unit. When a command input key displayed on the display unit has been touched or a physical key corresponding to the command input key has been operated, the controller 180 determines that a command to operate the command input key has been input (S15).

When it is determined that a command to operate the command input key has been input, the controller 180 determines whether or not the operated command input key is a command input key that allows input of a command to execute at least two applications (S20). When the operated command input key is a command input key displayed to input a command to execute one application, the controller 180 executes the application corresponding to the operated command input key (S25).

When the operated command input key is a command input key that allows input of a command to execute at least two applications, the controller 180 determines the pressure at which or the duration for which the command input key has been operated (S30). In the case where the command input key is displayed on the touch screen, the controller 180 determines the pressure at which or the duration for which the command input key has been operated from the pressure or duration of touch of the command input key. In the case where a physical key corresponding to the command input key is provided, the controller 180 determines the pressure or duration of operation of the command input key from the pressure or duration of operation of the physical key.

The controller 180 changes the display state of the command input key according to the type of application that is executed according to the determined operation pressure or duration (S35). In an example, when a command input key that allows input of a number has been operated for a long time, the controller 180 may change the display state of the operated command input key to a speed dial icon (S35). When a command input key that allows input of a command to capture a still image has been operated for a long time, the controller 180 may change the display state of the operated command input key to a command icon to capture a moving image. When a command input key that allows input of a command to delete a text message has been operated for a long time, the controller 180 may change the display state of the operated command input key to a command icon to permanently delete the text message. When a command input key that allows input of a command to send a text message has been operated for a long time, the controller 180 may change the display state of the operated command input key to a command icon to send an urgent text message. When a command input key that allows input of a phonebook search command has been operated for a long time, the controller 180 may change the display state of the operated command input key to a command icon to add an item to a phonebook.

The controller 180 executes an application corresponding to the determined operation pressure or duration (S40). The application executed according to the operation pressure or duration is an application to which the user can input a command for execution through the command input key whose display state has been changed. Thus, the user can know the type of application that will be executed according to the operation pressure or duration.

In FIG. 6, the controller 180 controls the vibration module 157 to generate vibration according to the operation pressure or duration of the command input key or according to the changed display state of the mobile terminal. The controller 180 displays command input keys on the display unit of the mobile terminal and determines the pressure or duration of operation of a command input key, which allows input of a command to execute at least two applications, when the command input key has been operated and changes the display state of the operated command input key according to the determination (S10~S30).

The controller 180 may control the vibration module 157 to generate vibration corresponding to the determined operation pressure or duration (S50). When the mobile terminal includes at least two vibration modules 157, the controller 180 may control the vibration modules 157 to generate vibration around the operated command input key. In an example, when the operation pressure or duration is increased, the controller 180 may increase the strength of vibration accordingly.

In addition, the controller 180 may control the vibration module 157 to generate vibration when the display state of the command input key is changed (S50). The display state of the command input key is changed when the command input key is operated at a predetermined pressure or greater or for a predetermined duration or longer. The controller 180 generates vibration when changing the display state of the command input key to allow the user to know that the display state of the command input key will be changed. The controller 180 may control the vibration module 157 to generate vibration around the command input key whose display state has been changed.

Figure 7:
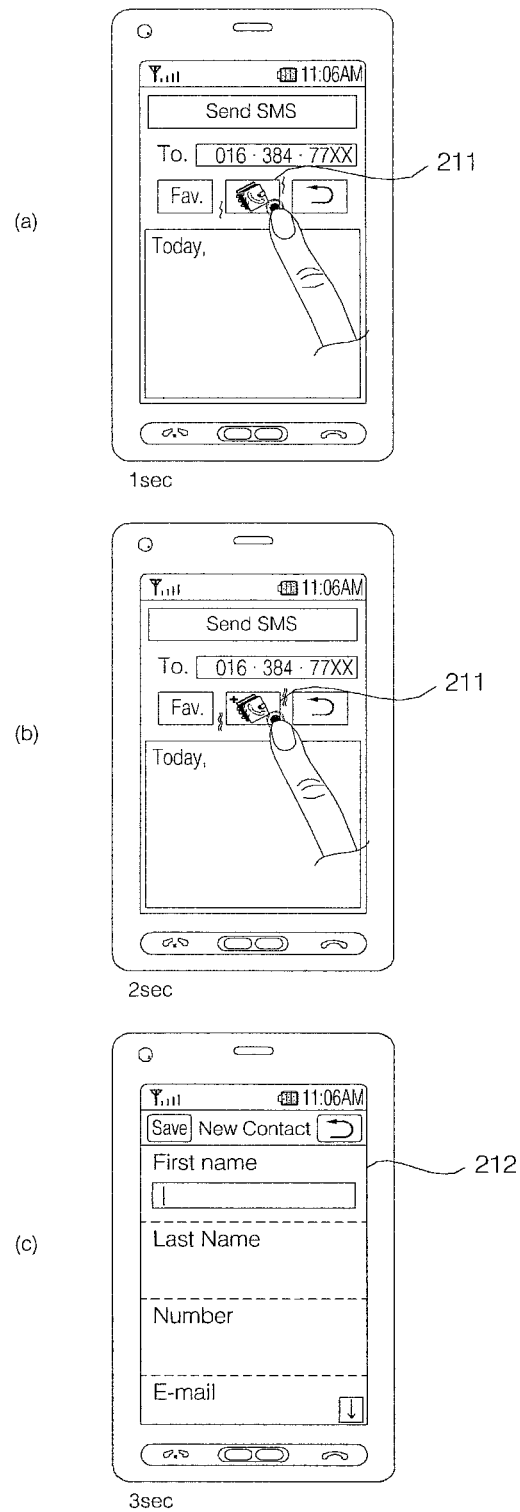
FIGS. 7 to 11 are drawings used to explain a method for controlling the operation of a mobile terminal according to embodiments of the present patent or application.

FIGS. 7(*a*) to 7(*c*) illustrate screens displayed on a mobile terminal according to a fourth embodiment of the present patent or application.

As shown in FIG. 7(*a*), the controller 180 may display a screen for executing a text messaging application on the display unit. The user may touch a command input key 211, which allows input of a command to search a phonebook, in order to search for a phone number of a counterpart to which the user will send a text message. The controller 180 controls the vibration module 157 to generate vibration around the command input key 211 upon determining that the command input key 211 has been operated.

The user may touch the command input key 211 for 2 seconds on the screen of FIG. 7(*a*). The controller 180 determines the duration of touch of the command input key 211 and controls the vibration module 157 to increase the strength of the vibration when the command input key 211 has continued to be touched for 2 seconds. As shown in FIG. 7(*b*), the controller 180 changes the display state of the command input key 211 to an icon that allows input of a command to add an item to the phonebook. Through the changed display state, the user can know that the command which is currently input to the mobile terminal by operating the command input key 211 is a command to add an item to the phonebook.

When the user has touched the command input key 211 for 3 seconds on the screen of FIG. 7(*a*), the controller 180 determines that the command input key 211 has continued to be touched for 3 seconds. The controller 180 executes an application for adding an item to the phonebook as shown in FIG. 7(*c*) in response to the operation of the command input key 211. The user may input a name of the counterpart for addition to the phonebook onto a screen 212 for executing the application for adding an item to the phonebook.

Figure 8:
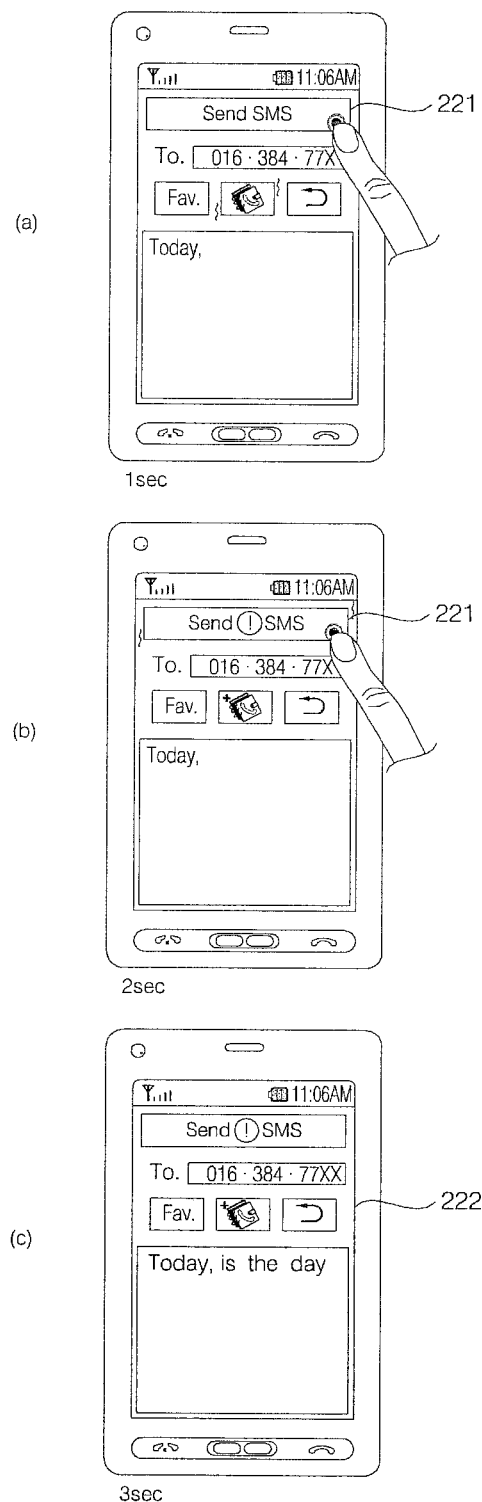

FIGS. 8(a) to 8(c) illustrate screens displayed on a mobile terminal according to a fifth embodiment of the present patent or application.

The controller 180 executes an application for sending a text message. The controller 180 displays a screen for executing the text messaging application on the display unit as shown in FIG. 8(a). The user touches a command input key 221, which allows input of a command to send a text message, on the screen of FIG. 8(a).

When it is determined that the command input key 221 has been touched, the controller 180 determines the duration of touch of the command input key 221. The user touches the command input key 221 for 2 seconds on the screen of FIG. 8(a). When it is determined that the command input key 221 has been touched for 2 seconds, the controller 180 changes the command input key 221 to a command input key that allows input of a command to send an urgent text message as shown in FIG. 8(b). The controller 180 may control the vibration module 157 to generate vibration while changing the command input key 221 from a text message sending command icon to an urgent text message sending command icon.

When the user has touched the command input key 221 for 3 seconds on the screen of FIG. 8(a), the controller 180 displays a screen 222 for executing an application for sending an urgent text message on the display unit as shown in FIG. 8(c). The user may input an urgent text message on the screen 222 for executing the application for sending an urgent text message.

Figure 9:
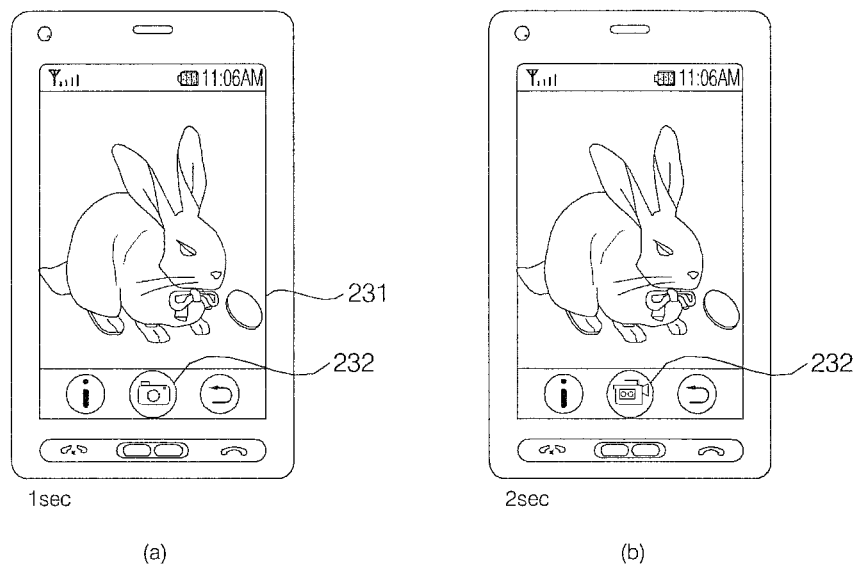

FIGS. 9(a) and 9(b) illustrate screens displayed on a mobile terminal according to a sixth embodiment of the present patent or application. The controller 180 may display a screen, which is currently being captured through the camera 121, on the display unit as shown in FIG. 9(a). The user may also touch a command input key 232 that allows input of a command to capture a still image on a preview screen 231 shown in FIG. 9(a).

When the user has touched the command input key 232 for a short time or for less than 2 seconds, the controller 180 captures an image, which is currently shown on the preview screen 231, through the camera 121. However, when the user has touched the command input key 232 for 2 seconds or longer, the controller 180 determines that the command input key 232 has been touched for 2 seconds or longer.

When the user has touched the command input key 232 for 2 seconds or longer, the controller 180 changes the display state of the command input key 232 as shown in FIG. 9(b). The controller 180 changes the display state of the command input key 232 to an icon that allows input of a command to capture a moving image. When it is determined that the user has continued to touch the command input key 232, the controller 180 may capture the image, which is currently shown on the preview screen 231, as a moving image through the camera 121.

Figure 10:
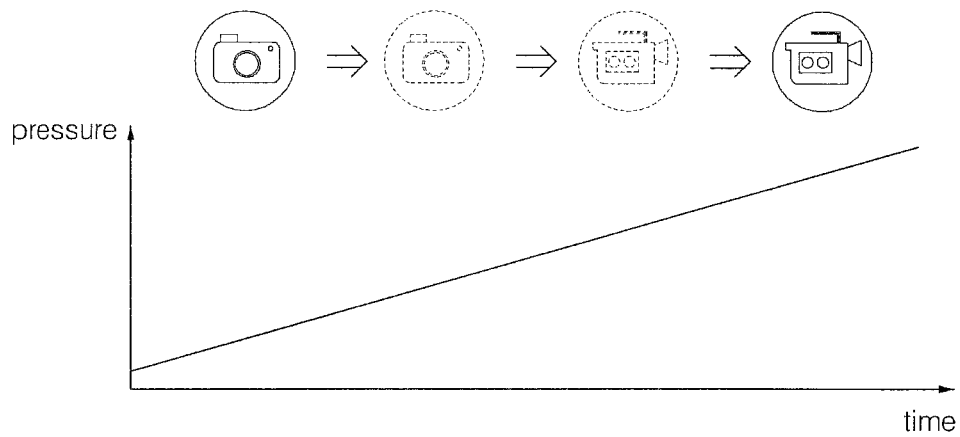

FIG. 10 illustrates how the display state of a command input key on a screen displayed on a mobile terminal is changed according to a seventh embodiment of the present patent or application. In this embodiment, the controller 180 gradually changes the display state of a command input key. In an example, the controller 180 gradually changes the display state of the command input key 232 shown in FIG. 9 as the pressure of touch of the command input key 232 gradually increases with time as represented by a graph shown in FIG. 10. Accordingly, the command input key 232 is changed from an icon that allows input of a still image to an icon that allows input of a moving image as shown in FIG. 10.

The controller 180 may generate vibration upon determining that a command input key has been touched. The controller 180 may generate the vibration at a strength corresponding to the pressure of touch. The controller 180 may also generate vibration when the display state of the command input key is changed. In the case where the display state of the command input key gradually changes as shown in FIG. 10, the controller 180 may control the vibration module 157 to generate a weak vibration during the change of the display state of the command input key.

Figure 11:
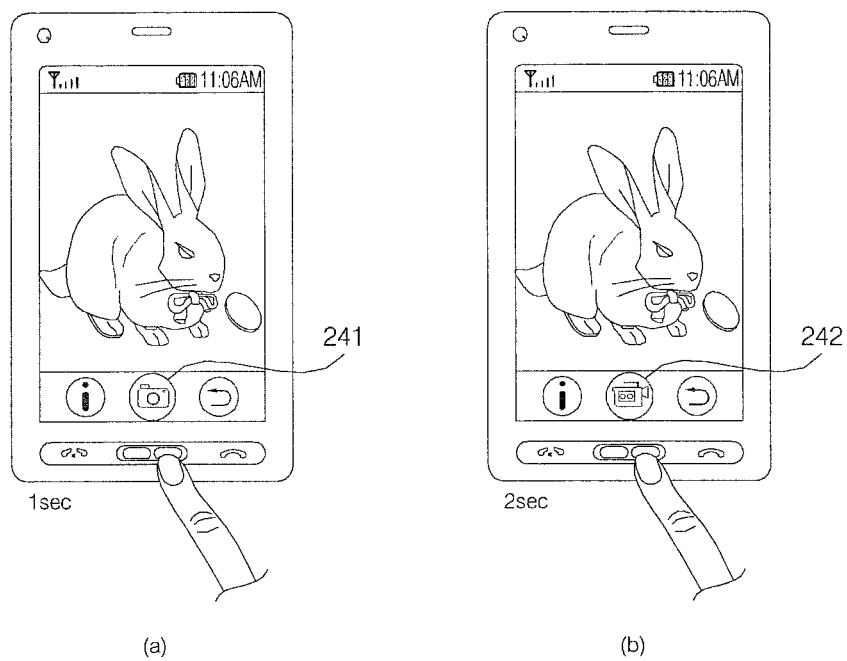

FIGS. 11(a) and 11(b) illustrate screens displayed on a mobile terminal according to an eighth embodiment of the present patent or application. In this embodiment, the controller 180 determines the strength of pressure or the duration of operation of a physical key corresponding to a command input key displayed on the display unit and changes a display state of the command input key according to the determination.

In the example of FIG. 11(a), the user operates a physical key corresponding to a command input key displayed as a still image capture command icon 241 for 1 second. If the user stops operating the physical key after operating the same for 1 second, the controller 180 determines that a command to capture a still image has been input and captures a still image through the camera 121.

If the user operates the physical key for 2 seconds or longer, the controller 180 determines that the command input key displayed as the still image capture command icon 241 has been operated for 2 seconds or longer. The controller 180 changes the display state of the command input key corresponding to the physical key from the still image capture command icon 241 to a moving image capture command icon 242 as shown in FIG. 11(b). Through the command input key corresponding to the physical key, the user can know that a command to capture a moving image has been input to the mobile terminal.

As is apparent from the above description, according to the present patent or application, it is possible to provide a mobile terminal which displays a command input key that enables a different application to be executed depending on the pressure or duration of operation of the command input key. The user can input a command to execute a different application by operating the command input key at a different pressure of operation or for a different duration of operation. From the display state of the command input key, the user can also easily identify a command to execute an application that is currently input to the mobile terminal.

The mobile terminal and the method of controlling the operation of the same according to the present patent or application are not limited in their applications to the configurations and methods of the embodiments described above and all or some of the embodiments may be selectively combined to implement various modifications.

The method for controlling the mobile terminal according to the present patent or application can be embodied as processor readable code on a processor readable medium provided in a mobile terminal. The processor readable medium includes any type of storage device that stores data which can be read by a processor. Examples of the processor readable medium include Read-Only Memory (ROM), Random-Access Memory (RAM), CD-ROMs, magnetic tape, floppy disks, optical data storage devices, and so on. The processor readable medium can also be embodied in the form of carrier waves as signals transmitted over the Internet. The processor readable medium can also be distributed over a network of coupled processor systems so that the processor readable code is stored and executed in a distributed fashion.

The present patent or application has been made in view of the above circumstances, and it is an object of the present patent or application to provide a mobile terminal and a method for controlling operation of the same, wherein, when the command input key which allows input of at least two commands has been operated, a display state of the command input key is changed according to the pressure or duration of operation of the command input key so that it is possible to identify which type of application is executed.

It is another object of the present patent or application to provide a mobile terminal and a method for controlling operation of the same, which can generate vibration corresponding to the display state of a command input key or corresponding to the pressure or duration of operation of the command input key.

In accordance with one aspect of the present patent or application, the above and other objects can be accomplished by the provision of a method for controlling operation of a mobile terminal, the method including displaying a command input key for executing a first application, determining, when a command input key for executing the first application has been operated, whether or not duration or pressure of the operation of the command input key has exceeded a predetermined value, and changing the command input key for executing the first application to a command input key for executing a second application when it is determined that the duration or pressure of the operation of the command input key has exceeded the predetermined value.

In accordance with another aspect of the present patent or application, there is provided a mobile terminal including a display unit for displaying a command input key for executing a first application, and a controller for determining, when a command input key for executing the first application has been operated, whether or not duration or pressure of the operation of the command input key has exceeded a predetermined value, and changing the command input key for executing the first application to a command input key for executing a second application when it is determined that the duration or pressure of the operation of the command input key has exceeded the predetermined value.

In accordance with another aspect of the present patent or application, there is provided a processor-readable recording medium on which a program allowing a processor to perform the above method is recorded.

According to the present patent or application, it is possible to provide a mobile terminal which displays a command input key that enables a different application to be executed depending on the pressure or duration of operation of the command input key. The user can input a command to execute a different application by operating the command input key at a different pressure or for a different duration. From the display state of the command input key, the user can also easily identify a command to execute an application that is currently input to the mobile terminal.

A method for controlling a mobile terminal is broadly disclosed and embodied herein, the method comprising displaying a first command input key associated with executing a first application; determining a duration or an amount of pressure of an input associated with the first command input key; determining whether the duration or the amount of pressure exceeds a predetermined value; and toggling between the first command input key associated with the first application and a second command input key associated with a second application when the duration or the amount of pressure exceeds the predetermined value.

In the method as broadly disclosed and embodied herein, the first or second command input key is an icon, an on-screen display (OSD), a widget, or a menu item. The method further comprises executing the second application after toggling the first command input key associated with the first application to the second command input key associated with the second application; generating a vibration having an intensity that corresponds to the determined input duration or the amount of pressure, wherein the vibration is generated around the first or second command input key; generating a vibration when the first command input key associated with the first application is toggled to the second command input key for executing the second application. In the method the step of toggling between the first and second command input keys includes gradually changing an image of the first command input key to an image of the second command input key according to the determined input duration or the amount of pressure; the first command input key is displayed on a touch screen, wherein determining the duration or the amount of pressure of the input associated with the first command input key includes determining a touch duration or the amount of pressure on the touch screen; and the mobile terminal includes a physical key corresponding to the first and second command input keys, wherein determining the duration or the amount of pressure of the input associated with the command input key includes determining a duration or the amount of pressure on the physical key.

A mobile terminal is broadly disclosed and embodied herein, the mobile terminal comprising a display that displays a first command input key associated with a first application program; a user input unit that receives a selection associated with the first command input key; and a controller configured to determine a duration or an amount of pressure of the selection, wherein the controller executes the first application program if the duration or the amount of pressure is less than a first predetermined duration or amount of pressure, and toggles between the first command input key associated with the first application program and a second command input key associated with a second application program if the duration or the amount of pressure is greater than the first predetermined duration or amount of pressure.

In the mobile terminal as broadly disclosed and embodied herein, the first or second command input key is an icon, an OSD, a widget or a menu item; the user input unit is a touch screen display; the selection associated with the first command input key includes a touch input at the first command input key on the touch screen display; the user input unit is a fixed button, the selection associated with the first command input key includes an input at the fixed button; the first application program is a camera application configured to capture a still image, and the second application is a video camera application configured to capture a video image; the mobile terminal further comprises a vibration module that generates a vibration associated with the execution of the first application program or the toggling between the first and second command input keys; the vibration module varies an intensity, frequency, or pattern of the vibration corresponding to the detected duration or amount of pressure; and the controller is configured to change the first command input key to a third command input key associated with a third application program if the duration or amount of pressure is greater than a second predetermined duration or amount of pressure, wherein the second predetermined duration or amount of pressure is greater than the first predetermined duration or amount of pressure; and the controller is configured to change the first command input key to the second command input key if the amount of pressure is gradually increased for the first predetermined duration, otherwise display the first command input key.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for controlling a mobile terminal, the method comprising:
    displaying in a prescribed area of a display of the mobile terminal a first command input key associated with executing a first application;
    determining a duration or an amount of pressure of an input associated with the first command input key at the prescribed area of the display;
    determining whether the duration or the amount of pressure exceeds a predetermined value; and
    toggling in the prescribed area of the display from the first command input key associated with the first application to a second command input key associated with a second application when the duration or the amount of pressure exceeds the predetermined values,
    wherein the step of toggling includes changing a first image corresponding to the first command input key to a second image corresponding to the second command input key according to the determined input duration or the amount of pressure.

2. The method of claim 1, wherein the first or second command input key is an icon, an on-screen display (OSD), a widget, or a menu item.

3. The method of claim 1, further comprising executing the second application after toggling the first command input key associated with the first application to the second command input key associated with the second application.

4. The method of claim 1, further comprising generating a vibration having an intensity that corresponds to the determined input duration or the amount of pressure.

5. The method of claim 4, wherein the vibration is generated around the first or second command input key.

6. The method of claim 1, further comprising generating a vibration when the first command input key associated with the first application is toggled to the second command input key for executing the second application.

7. The method of claim 6, wherein the vibration is generated around the first or second command input key.

8. The method of claim 1, wherein the first command input key is displayed on a touch screen, and wherein determining the duration or the amount of pressure of the input associated with the first command input key includes determining a touch duration or the amount of pressure on the touch screen.

9. The method of claim 1, wherein the mobile terminal includes a physical key corresponding to the first and second command input keys, and wherein determining the duration or the amount of pressure of the input associated with the command input key includes determining a duration or the amount of pressure on the physical key.

10. A mobile terminal comprising:
    a display that displays on a prescribed portion of the display a first command input key associated with a first application program;
    a user interface that receives a selection associated with the first command input key at the prescribed portion of the display; and
    a controller configured to determine a duration or an amount of pressure of the selection, wherein the controller executes the first application program if the duration or the amount of pressure is less than a first predetermined duration or amount of pressure,
    and toggles on the prescribed portion from the first command input key associated with the first application program to a second command input key associated with a second application program if the duration or the amount of pressure is greater than the first predetermined duration or amount of pressure,
    wherein the controller is further configured to change a first image corresponding to the first command input key to a second image corresponding to the second command input key if the duration or the amount of pressure is greater than the first predetermined duration or amount of pressure.

11. The mobile terminal of claim 10, wherein the first or second command input key is an icon, an OSD, a widget or a menu item.

12. The mobile terminal of claim 10, wherein the user input unit is a touch screen display.

13. The mobile terminal of claim 12, wherein the selection associated with the first command input key includes a touch input at the first command input key on the touch screen display.

14. The mobile terminal of claim 10, wherein the user input unit is a fixed button, wherein the selection associated with the first command input key includes an input at the fixed button.

15. A mobile terminal comprising:
    a display that displays on a prescribed portion of the display a first command input key associated with a first application program;
    a user interface that receives a selection associated with the first command input key; and
    a controller configured to determine a duration or an amount of pressure of the selection, wherein the controller executes the first application program if the duration or the amount of pressure is less than a first predetermined duration or amount of pressure, and toggles on the prescribed portion from the first command input key associated with the first application program to a second command input key associated with a second application program if the duration or the amount of pressure is greater than the first predetermined duration or amount of pressure,
    wherein the first application program is a camera application configured to capture a still image, and the second application program is a video camera application configured to capture a video image.

16. The mobile terminal of claim 10, further comprising a vibrator that generates a vibration associated with the execution of the first application program or the toggling between the first and second command input keys.

17. The mobile terminal of claim 16, wherein the vibrator varies an intensity, frequency, or pattern of the vibration corresponding to the detected duration or amount of pressure.

18. The mobile terminal of claim 10, wherein the controller is configured to change the first command input key to a third command input key associated with a third application program on the prescribed portion if the duration or amount of pressure is greater than a second predetermined duration or amount of pressure, wherein the second predetermined duration or amount of pressure is greater than the first predetermined duration or amount of pressure the third application being in associated with the second application.

19. The mobile terminal of claim 10, wherein the controller is configured to change the first command input key to the second command input key if the amount of pressure is increased for the first predetermined duration, otherwise display the first command input key.

20. The mobile terminal of claim 10, wherein the first application program is a camera application configured to capture a still image, and the second application program is a video camera application configured to capture a video image.

* * * * *